June 27, 1961  E. P. SELINDER  2,990,155
PRESSURE OPERATED VALVE
Filed March 30, 1959
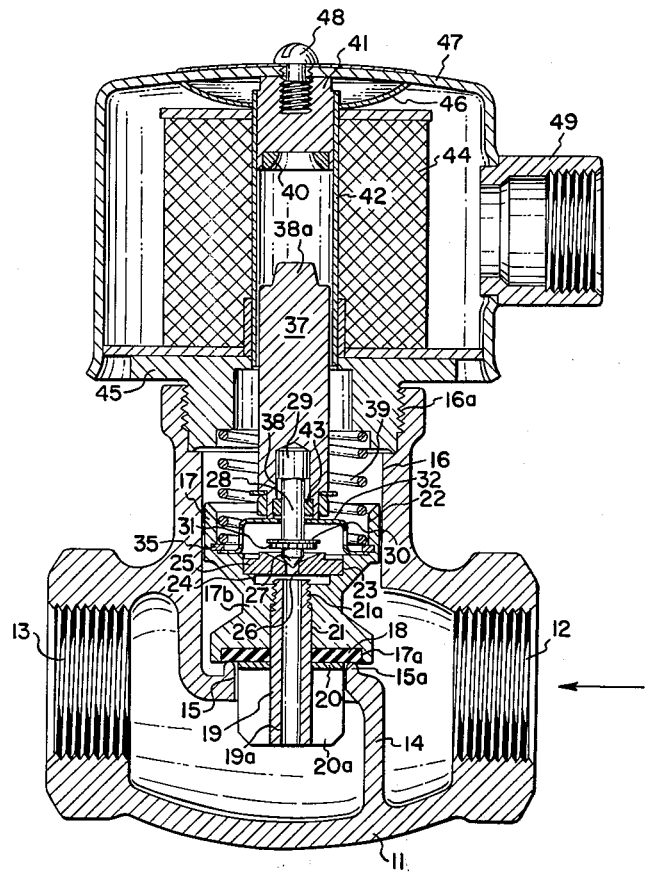
Fig-1
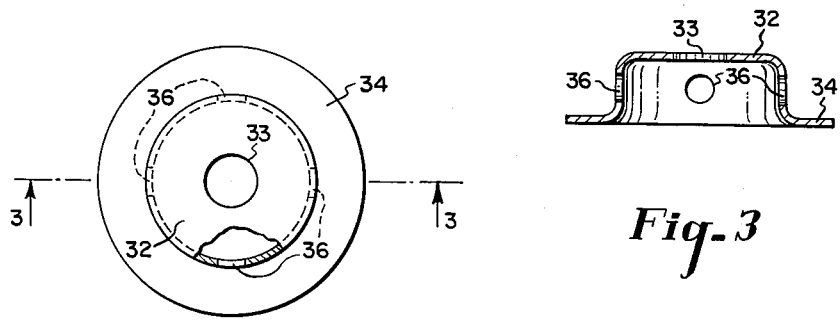
Fig-2
Fig-3
INVENTOR.
ERIC P. SELINDER
BY
Alan M. Staubly
ATTORNEY United States Patent Office 2,990,155
Patented June 27, 1961

2,990,155
PRESSURE OPERATED VALVE
Eric P. Selinder, Minneapolis, Minn., assignor to Minneapolis-Honeywell Regulator Company, Minneapolis, Minn., a corporation of Delaware
Filed Mar. 30, 1959, Ser. No. 802,790
2 Claims. (Cl. 251—30)

This invention relates to pressure operated valves, actuated by the fluid being valved, under the control of a pilot valve. More particularly, the invention relates to a solenoid operated pilot valve that controls the fluid pressure above a piston valve, so as to cause the piston valve to move slowly, and, thereby, reduce the amount of noise that it would normally make when the plunger of the solenoid and/or the piston reaches its end of travel by striking an abutment.

One of the objects of the invention is to provide a quiet operating valve of the above mentioned type.

Another object of the invention is to provide a pilot valve arrangement for use with a fluid pressure operated valve which will not be subject to clogging yet provide slow bleeding of control fluid from the pressure chamber, to cause the valve to move at a slower than normal rate.

A still further object of the invention is to provide a piston-type of pressure operated valve wherein a bleed passage through the piston valve is controlled by a pilot valve having means associated therewith to restrict the rate of flow of pressure fluid through the bleed passage and thus cause slow movement of the piston valve.

A still further object of the invention is to provide in a fluid pressure operated valve, a pilot valve having means associated therewith to create turbulence at the mouth of a bleed passage from the pressure chamber so as to cause slow movement of the valve with a consequent reduction in the noise of the operation thereof.

Still further objects of the invention will become apparent upon reading the following detailed description of the invention in conjunction with the accompanying drawing wherein:

FIGURE 1 is a vertical sectional view taken along the longitudinal axis of the valve;

FIGURE 2 is a plan view of the cage or inverted cup-shaped member positioned over a bleed passage through the piston valve with portions thereof broken away; and FIGURE 3 is a vertical sectional view of the cage taken along line 3—3 of FIGURE 2.

As can be seen in FIGURE 1 of the drawing, the valve body is generally designated by the reference numeral 11 and has a threaded inlet 12, a threaded outlet 13, a step-shaped wall 14 therebetween with an opening 15 through the horizontally extending portion of the wall, and an opening 16 in the top of the valve body which terminates in an internally threaded enlarged portion 16a.

The opening 16 through the top of the valve body is of cylindrical shape and has a piston 17 axially slideable therein. The lower end of the piston 17 has a recess 17a therein and a reduced diameter portion 17b intermediate the ends of the piston. A valve washer 18 is supported in the recess 17a by means of a tube 19 having an abutment shoulder 20 secured thereto intermediate its ends, with the upper end of the tube 19 externally threaded and screw-threaded into a threaded upper portion 21a of an axial bore 21 extending through the piston 17. The abutment shoulder 20 has a plurality of longitudinally extending guide ribs 20a that are adapted to cooperate with the sides of the bore 15 to axially guide the valve washer 18 toward and away from the valve seat 15a. If desired, a conventional skirt having a plurality of inverted V-shaped notches therein may be substituted for the ribs or used with the ribs to cause gradual reduction of fluid flow as the valve closes.

The upper end of the piston 17 has a downwardly stepped bore 22, 23, 24, which communicates with the passage 19a through the tube 19. Located in the bore 23 and against the bottom thereof, is a valve seat member 25 having an opening 26 therethrough in axial alignment with the passage 19a. This opening is of sufficient size to permit fluid flow therethrough at a greater rate than fluid can flow between the piston and the wall of the opening 16, so as to enable the fluid pressure above the piston 17 to be lower than that below the piston, to enable the fluid below the piston to raise the piston when the passage 26 is open.

The pilot valve 27, of inverted conical shape, has a stem 28 with a head 29 at its other end. An abutment washer 30 surrounds the stem 28 near the lower end thereof and is held in that position by means of a split washer 31 fitting in an annular groove in the stem adjacent the washer.

A cage or inverted cup-shaped member 32 (FIGURES 2 and 3) has an opening 33 therethrough through which the valve stem 28 extends, with the abutment shoulder 30 below the opening and the head 29 above the opening. An annular flange 34 is held against the bottom of the bore 22 by means of a split washer 35 fitting in an annular groove in the bore adjacent the flange 34. It will be noted from the drawing that the cage or cup-shaped member 32 is of relatively thin metal. This would enable the member to be formed by a relatively inexpensive stamping operation. The cage has a plurality of radially extending bores or apertures 36 therein which are so positioned as to be in axial alignment with the opposed bore and with the base of the cone-shaped valve head 27 when the valve 27 is in its open position, with the abutment washer 30 bearing against the under side of the cage 32 around the opening 33. This opposed relationship of the openings or bores 36 creates turbulence in the fluid flowing through these openings so as to materially reduce the rate of flow of the fluid through the opening 26 in the valve seat member 25. This permits the use of a much larger opening 26 than would normally have to be used if it were not for this turbulent action produced by this arrangement of the openings 36 with respect to the valve head 27. The fact that the wall of the cage is of relatively thin metal as compared with the diameter of the holes, as shown in FIGURE 3, tends to increase the turbulent action. This is due to the fact that the fluid does not have as much opportunity to form clearly defined jets as where the walls are thicker.

It has been found that for the valve size shown in the drawing, the ratio of the inside diameter of the cage or inverted cup-shaped member to the diameter of the bores or holes 36 should be approximately 5.5 to 1 or a maximum ratio of 6 to 1 and a minimum ratio of 5 to 1.

However, as there are a number of factors which affect the rate of fluid flow through various openings and passages, it is also obvious that for different valve body sizes, piston sizes and so forth, an optimum ratio between the cage diameter and the size of the opening in the cage will vary somewhat. Therefore, this invention is directed to the idea of so proportioning the sizes of the openings in the cage and the cage size, considering the other dimensions of the other elements of the assembly, so as to create turbulence in the fluid passing through the pilot valve seat, so as to slow down the movement of the piston that operates the main valve, without having to make the opening through the piston valve so small so as to be subject to clogging and still produce the desired result of reducing the noise level of the valve upon opening.

The valve 27 is moved to its open position by means of a solenoid plunger 37. The solenoid plunger 37 has an axial bore 38 extending upwardly from the bottom thereof, in which the head 29 of the valve stem is axially slideable, and a tapered projection 38a on the upper end of the plunger that is adapted to engage in a shading ring 40 in the fixed end 41 of a solenoid tube 42. An abutment washer 43 surrounds the stem 28 and is secured in the lower end of the bore 38 by means of staking (not shown). The plunger is biased outwardly of the tube 42 by means of coil spring 39.

The solenoid tube 42, with its surrounding coil 44, are carried by an annular nut 45 screw-threaded into the internally threaded portion 16a at the upper end of the cylinder 16. The coil 44 is resiliently held in place by means of a bowed spring 46 bearing against the inside surface of an inverted cup-shaped housing 47 which, in turn, is held in place by means of a screw 48 threaded into a threaded socket in the outer end of the plug 41. A threaded conduit connector 49 is provided in the housing 47 to permit electrical connection of the coil 44 to an external control circuit.

Operation

As illustrated in the drawing, the valve is in its closed position. Assuming that the valve is connected in a system for controlling the flow of water, energization of the solenoid coil 44 will cause the plunger 37 to rise in the coil 44 picking up the head 29 of the valve stem 28 and lifting the valve 27 off of its seat 25. Water which has accumulated above the piston 17 by passage thereof around and between the piston 17 and the cylinder wall 16, will rush through the bores 36 in streams which impinge upon each other at the base of the valve head 27. This impingement causes considerable turbulence at the inlet to the opening 26 in the valve seat so as to reduce the normal rate of flow through the opening 26 and through bleed passage 19a to the outlet 13. This restriction to bleeding of fluid from above the piston will cause the piston to move slowly to its full open position and thus prevent the plunger 37 from striking the stop 41 with much force, thus cutting down on the noise of opening.

Upon de-energization of the coil 44, the pilot valve will close causing the main valve to close. If a characterized skirt is used as a guide for the members 17—18, movement of said skirt, as the valve moves to closed position, will cause a more gradual reduction in the fluid flow through the valve and thus prevent "water hammer."

I claim:

1. A liquid flow control valve comprising a valve body having an inlet and an outlet with a valve seat therebetween and an opening in a side of said body on the inlet side of said valve seat, a movable wall in said opening, a first valve cooperable with said seat and operably connected to said movable wall, means closing said opening and forming with said movable wall a pressure chamber therebetween, a first bleed passage between said inlet and said pressure chamber, a second bleed passage between said pressure chamber and said outlet, a separate inverted cup-shaped member of relatively thin metal disposed on said movable wall, means for securing said cup-shaped member in engagement with said movable wall, said cup-shaped member being positioned over said second bleed passage and having diametrically opposed holes in the side walls thereof, the internal diameter of the cup-shaped member being substantially greater than the diameter of said holes and the thickness of the wall of said cup-shaped member being relatively small as compared with the diameter of said holes to supply impinging and turbulent liquid flow in said cup-shaped member, a second valve for opening and closing said second bleed passage and positioned between said holes, and means for actuating said second valve.

2. A liquid flow control valve comprising a valve body having an inlet and an outlet with a valve seat therebetween and an opening in a side of said body on the inlet side of said valve seat, a movable wall in said opening, a first valve cooperable with said seat and operably connected to said movable wall, means closing said opening and forming with said movable wall a pressure chamber therebetween, a first bleed passage between said inlet and said pressure chamber, a second bleed passage between said pressure chamber and said outlet, a separate inverted cup-shaped member of relatively thin metal disposed on said movable wall, means for securing said cup-shaped member in engagement with said movable wall, said cup-shaped member being positioned over said second bleed passage and having diametrically opposed holes in the side walls thereof, the internal diameter of the cup-shaped member being between 5 and 6 times the diameter of said holes and the thickness of the wall of said cup-shaped member being relatively small as compared with the diameter of said holes to supply impinging and turbulent liquid flow in said cup-shaped member, a second valve for opening and closing said second bleed passage and positioned between said holes, and means for actuating said second valve.

References Cited in the file of this patent

UNITED STATES PATENTS

| 2,020,833 | Hansen | Nov. 12, 1935 |
| 2,301,581 | Ray | Nov. 10, 1942 |
| 2,795,391 | Krone | June 11, 1957 |

FOREIGN PATENTS

| 218,805 | Great Britain | of 1924 |
| 789,241 | Great Britain | of 1958 |